(12) United States Patent
Sloan et al.

(10) Patent No.: US 7,736,521 B2
(45) Date of Patent: Jun. 15, 2010

(54) VISCOSITY CONTROL AND FILTRATION OF WELL FLUIDS

(75) Inventors: Robert L. Sloan, Katy, TX (US); Kevin W. Smith, Houston, TX (US); Harry D. Smith, Jr., Montgomery, TX (US)

(73) Assignee: Total Separation Solutions, LLC, Houston, TX (US)

( * ) Notice: Subject to any disclaimer, the term of this patent is extended or adjusted under 35 U.S.C. 154(b) by 439 days.

(21) Appl. No.: 11/804,986

(22) Filed: May 21, 2007

(65) Prior Publication Data

US 2007/0215346 A1 Sep. 20, 2007

Related U.S. Application Data

(63) Continuation-in-part of application No. 11/080,838, filed on Mar. 14, 2005, now Pat. No. 7,231,973.

(60) Provisional application No. 60/553,590, filed on Mar. 15, 2004.

(51) Int. Cl.
*E21B 21/06* (2006.01)
*B01D 1/00* (2006.01)

(52) U.S. Cl. .................. 210/739; 210/742; 210/748.02; 210/805; 175/66; 166/252.5; 159/47.3

(58) Field of Classification Search .................... 175/66, 175/206, 207; 210/748.02, 742, 739; 166/252.5
See application file for complete search history.

(56) References Cited

U.S. PATENT DOCUMENTS

| | | | |
|---|---|---|---|
| 2,156,333 A | 5/1939 | Cross et al. | |
| 3,198,191 A | 8/1965 | Wyzomirski | |
| 4,743,384 A | 5/1988 | Lu et al. | |
| 4,779,575 A | 10/1988 | Perkins | |
| 4,990,268 A | 2/1991 | Burba, III et al. | |
| 5,055,209 A | 10/1991 | Bridges et al. | |
| 5,132,025 A | 7/1992 | Hays | |
| 5,134,118 A | 7/1992 | Patel et al. | |
| 5,183,513 A | 2/1993 | Sajewski | |
| 5,184,576 A | 2/1993 | Sajewski | |
| 5,188,090 A | 2/1993 | Griggs | |
| 5,239,948 A | 8/1993 | Sajewski | |
| 5,257,528 A | 11/1993 | Degouy et al. | |
| 5,279,262 A | 1/1994 | Muehleck | |
| 5,385,298 A | 1/1995 | Griggs | |
| 5,419,306 A | 5/1995 | Huffman | |
| 5,472,620 A | 12/1995 | Huang | |

(Continued)

*Primary Examiner*—Matthew O Savage
*Assistant Examiner*—Paul J Durand
(74) *Attorney, Agent, or Firm*—William L. Krayer

(57) ABSTRACT

Circulating completion, workover and drilling fluids used in hydrocarbon recovery are filtered after monitoring for viscosity, which frequently causes plugging of filters. A viscometer generates a signal representative of viscosity in the fluid; the signal is used by a programmable controller to divert viscous fluid from the filter, or to take other action to prevent damage to the filter. The viscometer can be used in various positions in the system. Fluids deemed too viscous for the filter can be sent to a viscosity-reducing device, which may be a heating, shear-thinning, or cavitation device, to reduce its viscosity, enabling the fluid to pass through a filter without fouling. After filtering and a return to a lower temperature, the fluid may be treated if necessary to become viscous again for a useful purpose.

16 Claims, 12 Drawing Sheets

U.S. PATENT DOCUMENTS

| | | |
|---|---|---|
| 5,931,153 A | 8/1999 | Giebeler |
| 5,957,122 A | 9/1999 | Griggs |
| 6,016,798 A | 1/2000 | Selivanov |
| 6,077,435 A | 6/2000 | Beck et al. |
| 6,110,875 A | 8/2000 | Tjon-Joe-Pin et al. |
| 6,164,274 A | 12/2000 | Giebeler |
| 6,474,143 B1 | 11/2002 | Herod |
| 6,503,568 B1 * | 1/2003 | Oota et al. .................. 427/345 |
| 6,581,859 B2 | 6/2003 | Adams et al. |
| 6,595,759 B2 | 7/2003 | Crosta |
| 6,596,178 B1 | 7/2003 | Archibald |
| 6,627,784 B2 | 9/2003 | Hudson |
| 6,666,906 B2 | 12/2003 | Hallman |
| 6,794,340 B2 | 9/2004 | Nguyen et al. |
| 6,883,608 B2 | 4/2005 | Parlar et al. |
| 6,913,080 B2 * | 7/2005 | Lehman et al. .......... 166/252.3 |
| 6,933,262 B1 | 8/2005 | Chesser et al. |
| 6,959,669 B2 | 11/2005 | Thoma |
| 6,976,486 B2 | 12/2005 | Thoma |
| 6,987,083 B2 | 1/2006 | Phillippi et al. |
| 7,001,872 B2 | 2/2006 | Pyecroft et al. |
| 6,981,549 B2 | 6/2006 | Morales et al. |
| 7,089,886 B2 | 8/2006 | Thoma |

\* cited by examiner ly as the gel-
VISCOSITY CONTROL AND FILTRATION OF WELL FLUIDS

RELATED APPLICATION

This is a continuation-in-part, and claims the full benefit of, application Ser. No. 11/080,838 filed Mar. 14, 2005, now U.S. Pat. No. 7,231,973, which in turn claims the full benefit of provisional application No. 60/553,590 filed Mar. 15, 2004.

TECHNICAL FIELD

The filtration of well treatment fluids is improved by monitoring the fluids for viscosity, and diverting or treating the fluid when there is danger of filter clogging due to gel formation. Treatment includes heating and/or shear-thinning to reduce viscosity; certain filters may also effect shear-thinning. A useful viscosity can be restored after filtering if necessary.

BACKGROUND OF THE INVENTION

In the production of oil and gas from the earth, drilling and completion fluids are commonly recirculated through a filter. The benefits of clean completion and drilling fluids have been well established. The most common method of filtering the completion and drill-in fluids has been the use of diatomaceous earth (sometimes briefly "DE") filters and cartridge filters. In either case, the conventional filters are satisfactory for removing simple contamination, but frequent shutdowns are required to remove cake from the DE filters and to replace the cartridge filters. Cake or other solids buildup is detected or assumed from an increase in pressure or a decrease in flow rate. Cake and/or other solids cannot normally be removed by backflow or otherwise from cartridge filters, which utilize porous media. The expensive cartridge filters must be replaced.

Unfortunately, caking and solids loading of the filters are not the only causes of decreased flow or increased pressure. The widespread use of gelling agents, viscosifying agents and the like in brines, drilling mud, cleaning sweeps, and other well fluids greatly increases the incidence of filter fouling. They may be introduced to the fluid in the form of dissolved powder, circulation "pills," viscosifying solutions, and by any other means or in various solutions known to the hydrocarbon production art. The gels or viscous liquids can include, most commonly, hydroxyethylcellulose (HEC), but xanthan gum, various guar gum derivatives, polyacrylamide and other synthetic water soluble polyacrylates are frequently introduced to wellbores.

When circulated gel-inducing agents reach a fluid return tank or holding tank, they can remain intact or become mixed into the completion fluids. Almost immediately as the gel-inducing agents enter a filter, they are likely to blind off a DE filter or plug cartridge filters. This blinding off requires a total shut down and cleaning of the filter as previously described. In the case of the DE filter, a minimum of one hour is required before filtration can resume, costing valuable rig time and expense. Replacing cartridge filters is likewise time consuming and expensive as some filter pods may hold as many as fifty (50) elements per housing.

In the current practice of filtration of well treatment fluids, there is no defense against the sudden introduction of fouling polymers and gels in the fluid entering the filters. Sudden and drastic reductions in flow and increases in pressure are common and the operators of the filters must be prepared almost without notice to shut down the filters and take action to return them to working order. Such interruptions in normal procedures are very expensive, especially in off-shore rigs and other remote sites.

Another difficulty in the re-use of well treatment fluids, and the preparation of fresh ones, is that polymeric additives can be present in a concentration too high or too low. In the case of recycled fluid, where several desired additives are present also but in varying concentrations too dilute for effective use, the question of how most efficiently to adjust them while also adjusting the polymer concentration is perplexing.

SUMMARY OF THE INVENTION

The invention utilizes an in-line viscometer capable of detecting low viscosity fluids—that is, a viscosity slightly increased over the usual viscosity of the substantially gel-free fluids normally processed by the filter. A viscosity reading from the viscometer is connected to a programmable controller that is activated when a fluid exceeds the programmed threshold settings for allowable viscosities. The programmable controller can be programmed to do one or more of a) stop the pump, b) switch valves and by-pass the filter unit, diverting the contaminated fluid to a separate designated holding tank where chemical treatments will break the viscous fluid, c) provide a read-out or alarm for operating personnel, and d) re-establish filtration once fluid returns to below threshold levels.

One additional approach of our invention is to heat an unacceptably viscous fluid to reduce the viscosity prior to filtration. This is especially useful and economic where the viscosity-imparting agent is not significantly degraded by heating and where the viscosity-imparting properties are restored by cooling.

Generally, a viscous liquid will become less viscous as it is heated, although there are exceptions depending on the chemistry of the liquid. Oil and other hydrocarbon well brines commonly not only include various salts and other chemicals, but include polymers added to enhance the viscosity of the fluid for various purposes, principally to assure or enhance the suspension of solid particulates such as proppants, drill cuttings, sand or debris from the well. Polymeric compounds such as guar, xanthan, polyacrylamide, carboxymethylcellulose, and various derivatives of each are commonly used as viscosifiers in oil well fluids, and studies substantiate that the viscosities of typical such oilfield polymer-containing fluids generally decrease with increasing temperature—see, for example, Patel U.S. Pat. No. 5,134,118 and especially FIG. 2 of Morales et al U.S. Pat. No. 6,981,549. This is consistent with the viscosity/temperature relationships of non-Newtonian fluids in general. While the results may vary somewhat with the remainder of the compositions in actual practice, including the amount and type of solids in them, and with other conditions such as pH and hydrolysis, correlations of temperatures to viscosities are demonstrable in almost all cases where there are not overriding chemical reactions. The presence of significant amounts of clays such as diatomaceous earth should also be considered in some instances. But in most cases, the operator of a particular fluid processing system will know or be able to determine what is in the fluid he expects to filter, and can estimate within a useful degree of accuracy the concentration of polymer required to yield a particular viscosity at a given temperature. The relationship of temperature to viscosity in the commonly used guar and guar derivatives such as hydroxypropylguar (HPG), carboxymethylhydroxypropyl guar (CMHPG), cellulose derivatives such as hydroxyethyl cellulose (HEC), xanthan gum and various xanthan derivatives has been amply shown. See Monograph Volume 12, SPE, Henry L Doherty Series, Chapter 7, by John W. Ely, of "Recent Advances in Hydraulic Fracturing" by Gidley, Holditch, Noroda and Veath, pages 131, 133-134. See also Chapter 9 "Fracturing-Fluid Flow Behavior" by Cameron and Proudhomme in the same publication, pages 184,186.

Oilfield fluids containing viscosity-imparting agents are almost always non-Newtonian, in that their viscosity will change as a function of shear rate. See the entire Cameron and Proudhomme chapter cited in the Gidley et al book cited above (pages 184-195. Accordingly, another aspect of our invention is that a reduction of the viscosity which had been attained due to the presence of a viscosity-imparting agent in the fluid to be treated may be achieved by shear-thinning, a well-known phenomenon and procedure which may occur when a viscous fluid is passed between two surfaces; frequently one surface is moving with respect to the other. For our purposes, shear-thinning is defined as a reduction in viscosity effected by shear on or in a polymer-containing fluid. It is immaterial for purposes of our definition whether the shearing causes a physical degradation of the polymer, or a new orientation or deployment of the polymer backbone in solution, or a disruption of crosslinking bonds, or a chemical result such as a change in hydrolysis of the polymer. While many if not most polymers used in oilfield fluids cause the fluid to be thixotropic, it is not essential in our invention for the thixotropic properties of the fluid to be related to the reduction in viscosity caused by shearing. Nor is the fact that the shear effect may be reversible, or irreversible, or only partially reversible when the shearing force is removed or, if the reduction in viscosity is time-dependent, may change in viscosity at some point in time after the shearing force is removed. We may utilize the shearing effect to our advantage by reducing the viscosity of a fluid which is too viscous to pass through a filter without premature fouling, in order to filter it, regardless of the physical or chemical mechanism which brings about the reduction in viscosity.

While we have described our invention in some instances using a cavitation device, which is defined below, we may also use various shear-thinning devices or machines which do not provide heating by cavitation. Such devices include, broadly, dynamometers (some of which have come to acquire that name in spite of the fact they may not measure anything) and water brakes. Water brakes and other types of absorbing dynamometers convert the energy of a rotor on a turning shaft into thermal energy due to the turbulence and/or shear-thinning generated in the water in which it is immersed. In the description below, shear-thinning may accompany heating in the cavitation device or it may be accomplished apart from a significant heating effect in any other context. We intend to include either shear-thinning or heating devices to reduce the viscosity of the used oilfield fluid, as well as devices which normally accomplish both shear-thinning and heating, such as a cavitation device. Electric heating devices of various known kinds can be used simply to elevate the temperature of the fluid, as can various heat exchangers acting to transfer waste heat from Diesel engines, compressors and the like which may be present at the site.

Where large volumes of fluids are to be filtered, the viscometer is preferably located in a bypass or sampler line for a more or less continuous sample of fluid. Also, a basket strainer or similar device may be inserted in the sampler line upstream of the viscometer to protect it from damaging objects in the fluid.

Our invention includes the incorporation of a screen, notably a wedge wire screen, upstream of the filter to intercept solids of a predetermined size before they meet the filter medium.

The invention will maximize filter life, maximize dirt holding capacity, save rig time & expense, reduce fluid loss due to contamination and waste, minimize disposal cost, and reduce operating costs.

The invention is particularly useful in conjunction with a filter of the type described by Asher and Hampton in U.S. Pat. No. 5,824,232 titled "Corrugated Filter Sheet Configured into a Cylindrical Filter Media having Near Circular Concentric Channels," incorporated herein by reference in its entirety. Filters of sintered plastic particles are also useful—see U.S. Pat. Nos. 6,030,558 and 6,399,188 to Smith and Fullerton, wherein rapid water quenched polyolefin pellets are compacted into a desired filter shape and fused at their points of contact to form permeable shapes and masses. Although any filter satisfactory for filtering well fluids can be used we have found that the sintered pellet filters of Smith and Fullerton will filter and shear-thin at the same time. Thus the viscosity of the fluid need not be reduced prior to filtering. Also, such a filter may be advantageously considered where, for whatever reason, heating may permanently damage the polymer; in this case, shear-thinning without significant heating can be accomplished in filters of sintered particles. Such filters could be used also where the polymer is known to recover its viscosity-imparting properties within a few seconds after the cessation of shear-thinning. The Smith and Fullerton U.S. Pat. Nos. 6,030,558 and 6,399,188 are hereby specifically incorporated herein in their entireties.

DETAILED DESCRIPTION OF THE INVENTION

Figure 1:
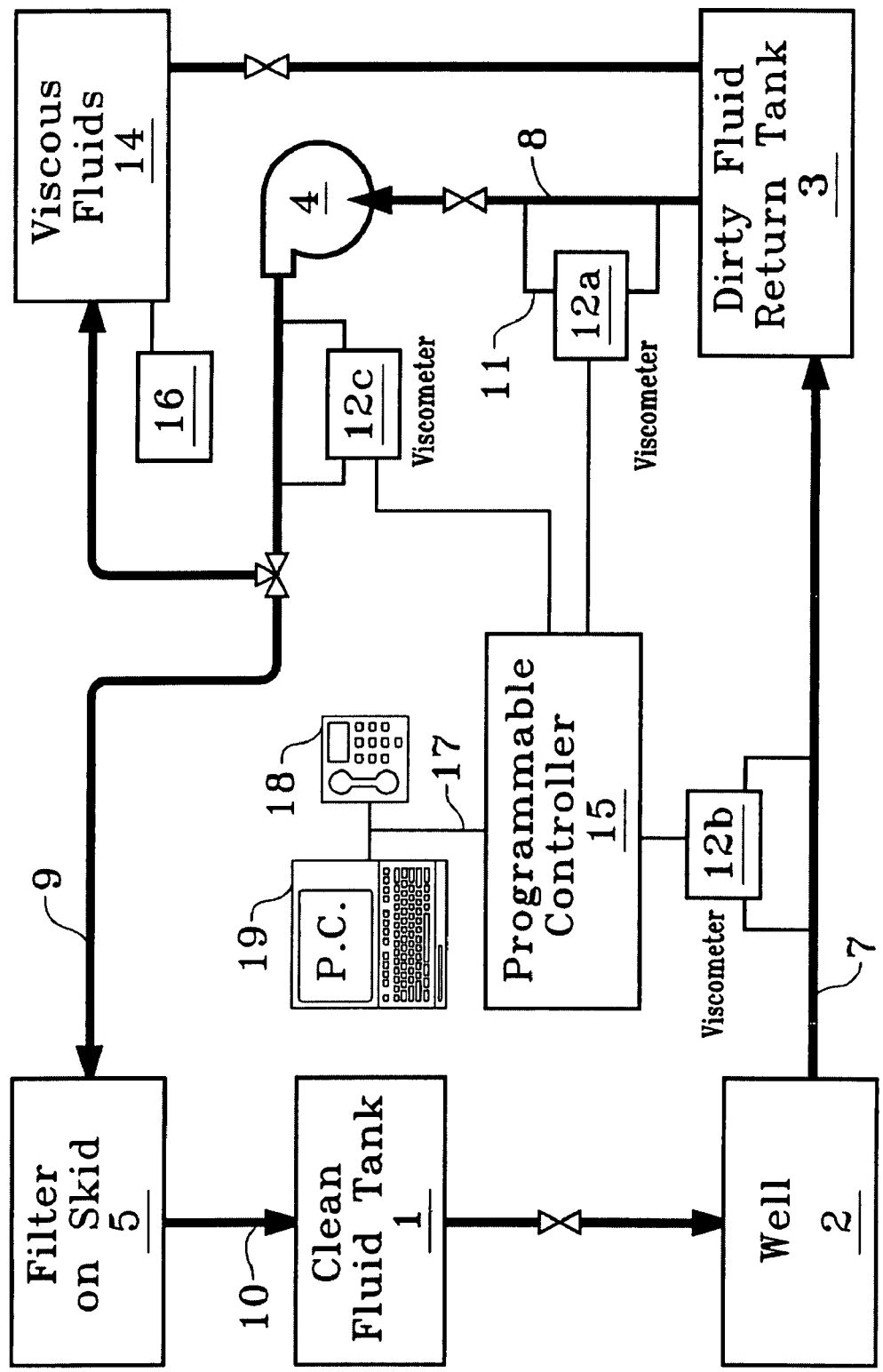
FIG. 1 is a block diagram/flow sheet of a filtration system in an oil production setting, using the invention. Some of the devices shown are optional.

In FIG. 1, the system is seen to include a clean fluid tank 1, which is the source of completion, workover, or other fluid for the well 2. The fluid is injected into and flows out of the well, as is known in the art, through line 7 to the dirty fluid return tank 3. Pump 4 draws dirty fluid from tank 3 through line 8 and sends it through line 9 to the filter 5, where solids are removed. Filter 5 is typically mounted on a skid. After passing through the filter 5, the fluid is directed through line 10 to clean fluid tank 1 where it is held for use in the well 2, and the circulation continues until the filter 5 is clogged, which may be discerned by an increase in pressure or a decrease in flow rate. (Pressure and flow meters are not shown). Normally the filter cake will not be directly visible, as the filter 5 is enclosed in a steel vessel.

As indicated above, clogging of the filter 5 will cause circulation of fluid to be suspended, as the filter is cleaned or replaced. Clogging is accelerated by viscous fluid reaching the filter surface. Frequent and disruptive clogging is expensive and time-consuming.

FIG. 1 includes placement of a viscometer 12a and related controls. A bypass 11 has been attached to line 8, permitting a portion of the fluid in line 8 to proceed to viscometer 12a. The bypass portion of fluid proceeds through the viscometer 12a and is returned to line 9 for filtration with the main portion of the fluid sent to filter 5. The viscometer 12a thus monitors the viscosity of fluid coming from the dirty fluid return tank 3. The viscosity reading from viscometer 12a is forwarded electronically to programmable controller 15, which is programmed to take action if the viscosity exceeds a chosen threshold value. The action it takes may include any or all of (a) stop the operation of pump 4, (b) switch valves and by-pass the filter unit, thereby sending the viscous fluid to a separate designated holding (viscous fluids tank) tank 14 where chemical treatments will break the viscous fluid, (c) provide a read-out or alarm for operating personnel, and/or (d) re-establish filtration once fluid returns to below threshold levels. In addition, the high viscosity signal may be used to dilute fluid in the dirty fluid tank 3 or to dilute it elsewhere in the system upstream of the filter 5, providing a delay before the filter needs to be cleaned or changed.

Optionally, a viscometer may be placed to monitor a slip stream on line 7 (viscometer 12b) or in line 9 directly downstream from pump 4 (viscometer 12c), in each case being equipped to generate a signal representing viscosity which may be used for one or more of the purposes (a) to (d) listed above, or to supplement the signal generated by viscometer 12a. In addition, if a reading in viscometer 12b is high, the fluid in line 7 may be directed immediately to viscous fluid tank 14 or elsewhere; by this procedure, the dirty fluids return tank will not be full of gel-producing material when the threshold reading is reached; rather, the liquid in the dirty fluids tank 3 would still be satisfactory for sending to the filter for some time after the point when undesirably viscous fluid begins coming from the well.

The viscosity signal may also be used to control the feeding of calcium hypochlorite, sodium hypochlorite, or other material from container 16 to the viscous fluid tank 14. These materials are known to be effective in reducing the molecular weight of hydroxyethylcellulose, a common viscosifying agent, but any chemical agent useful for reducing the viscosity of the viscous fluid diverted to viscous fluid tank 14 may be used. Programmable controller 15 can deliver such de-viscosifiers to viscous fluid tank 14 at a rate more or less proportional to the amount of viscous fluid diverted to it. Of course, feeding of the de-viscosifying agents to tank 14 could be accomplished manually or by mechanical means independent of the programmable controller.

Except for line 17 connecting programmable controller 15 with computer 19 and phone 18, the electrical connections in FIG. 1 do not have reference numbers as it should be understood that any system, wired or unwired, capable of performing the above described functions may be used.

Figure 2:
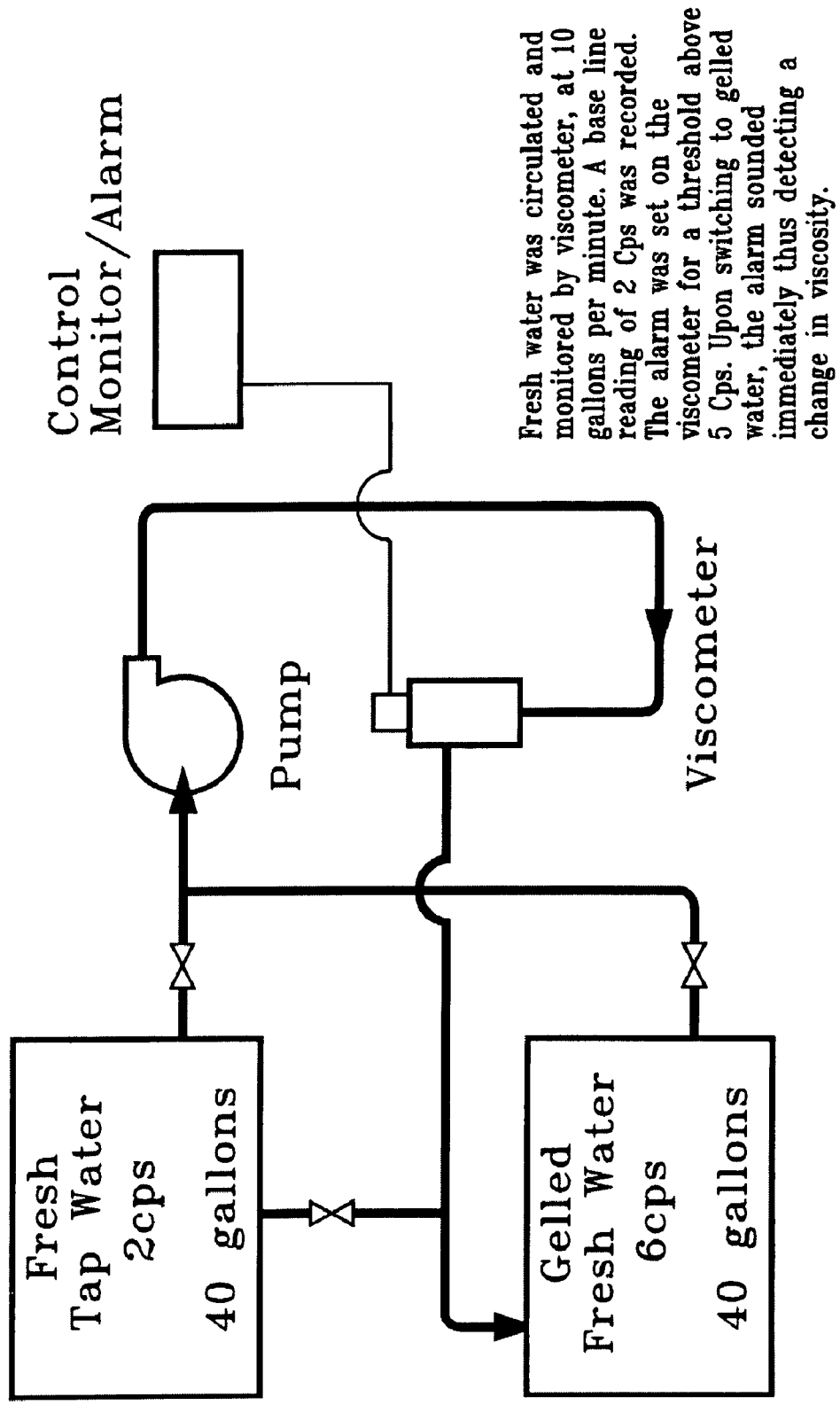
FIG. 2 is a block diagram/flow sheet of a laboratory test useful in our invention.

FIG. 2 shows the laboratory setup for a test using 5 Cps as the alarm threshold. Such an alarm or related control signal can be used to divert the unacceptably viscous fluid to the contaminated fluids tank 14 or otherwise protect the filter.

To perform in an offshore facility or other harsh environment, the viscometer should contain no moving parts to wear or bind. It should be built out of 316 stainless steel, easy to clean and with low maintenance. The viscometer should be capable of pressures up to 200 psi and operate in temperatures up to 250° F. The viscosity range should be from 2 cP to 3000 cP or equivalent cup-seconds. The main focus should be on a meter that is designed for low viscosity fluid and operates at low hertz without fluid interference or impedance. Viscometers which operate using vibrating forks or rotating bobs but are generally not sensitive to low viscosity fluids and are therefore only applicable to high viscosity readings. The viscometer should be chosen with the desired threshold or cutoff viscosity in mind, as well as the conditions of use.

Figure 3:
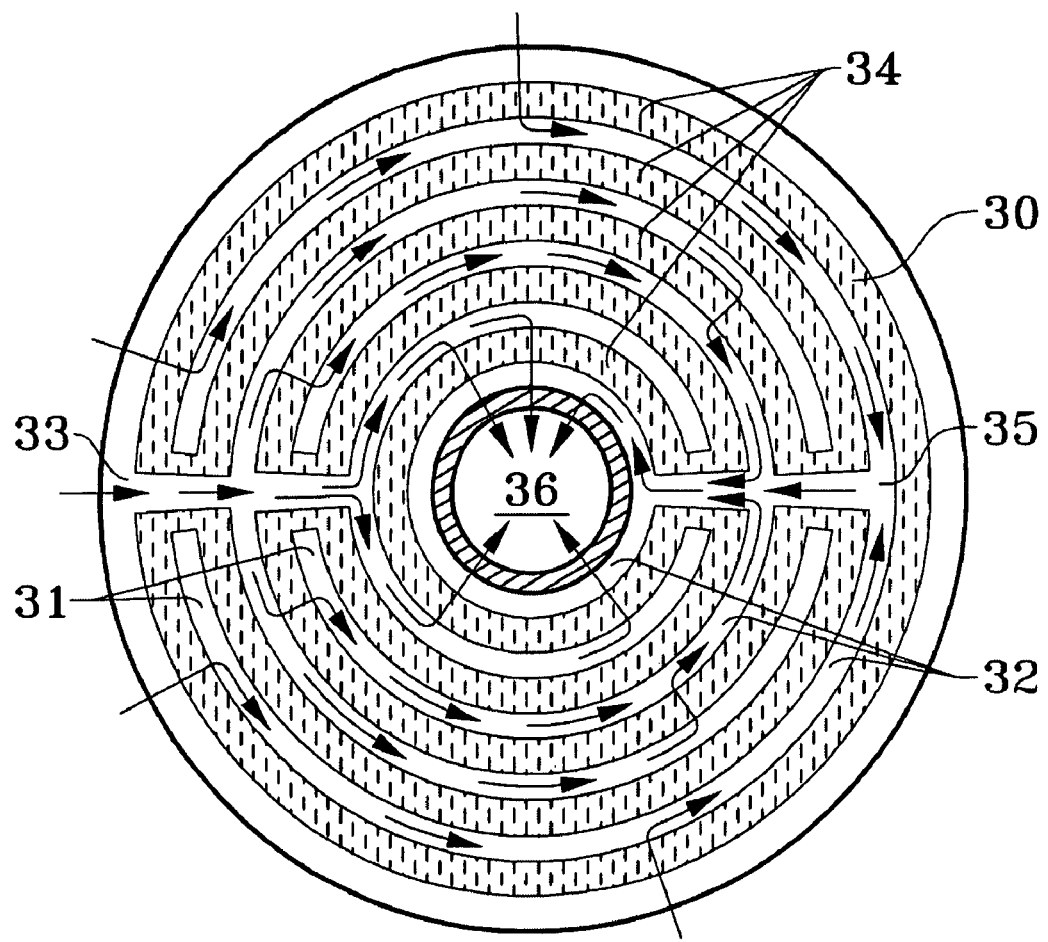
FIG. 3 is a view of a filter useful in our invention.

FIG. 3 is taken from FIG. 9 of Asher and Hampton U.S. Pat. No. 5,824,232, which describes a filter I have found to be particularly useful in my invention. FIG. 3 is a schematic of the bottom seal member, showing the flow of fluid in the cylindrical housing of the filter. To paraphrase the general description in that patent, it comprises a filter sheet 30 formed of a rigid, corrugated, perforated material, the filter sheet forming a generally cylindrical filter medium having a plurality of near circular concentric channels 31 and 32, wherein the filter medium defines first and second radial flow paths interconnecting the channels and radially extending across the filter. Flow may be in either direction, and backwashing is readily accomplished. As illustrated in FIG. 3, the unfiltered fluid enters at inlet conduit 33, flows between the layers 34 of filter media, through the filter media (solids of a specified size will be separated anywhere on the surface of the filter media layers 34) to outlet channels 35, and into filtered media outlet conduit 36. Although this type of filter has proven to be excellent in our invention, I am not limited to this particular type of filter. Any filter capable of handling the quantities of fluid to be expected can be used.

Figure 4A:
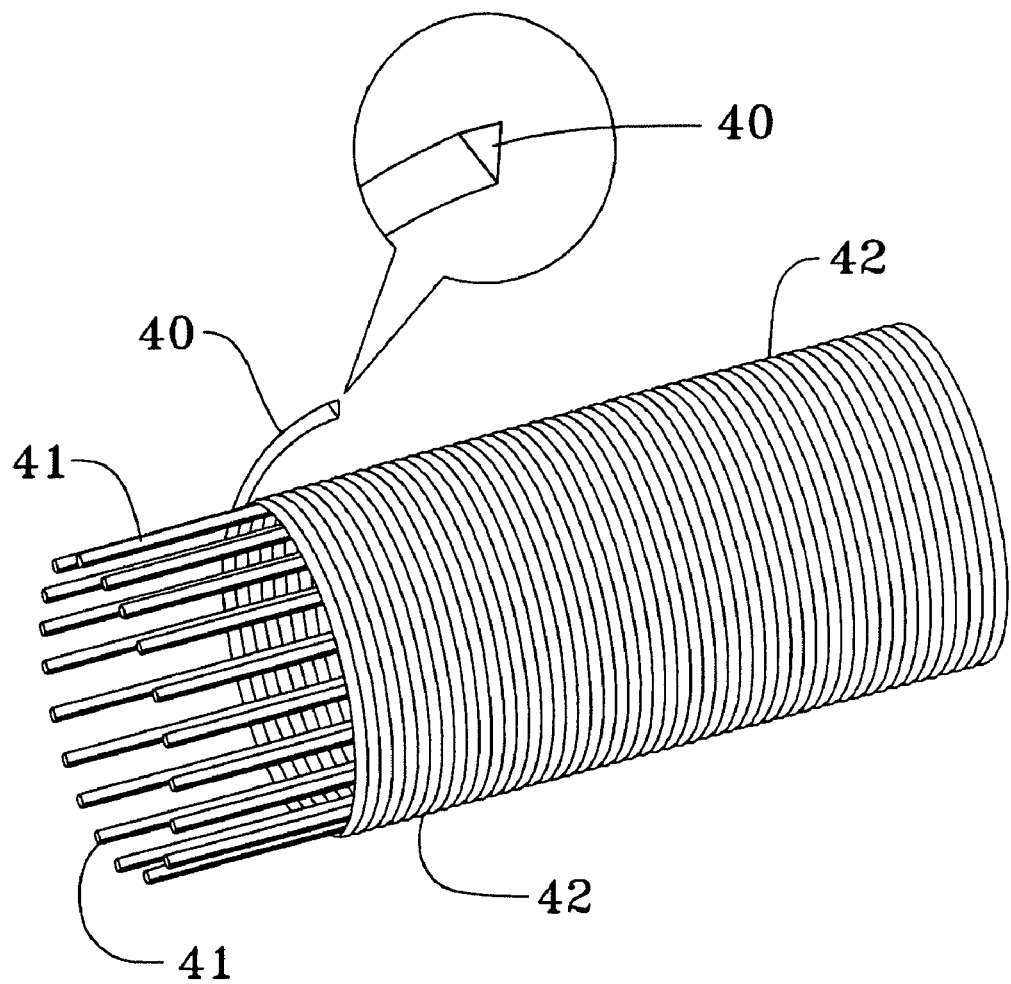
FIGS. 4a-4e illustrate a wedge wire screen useful in our invention.
Figure 4B:
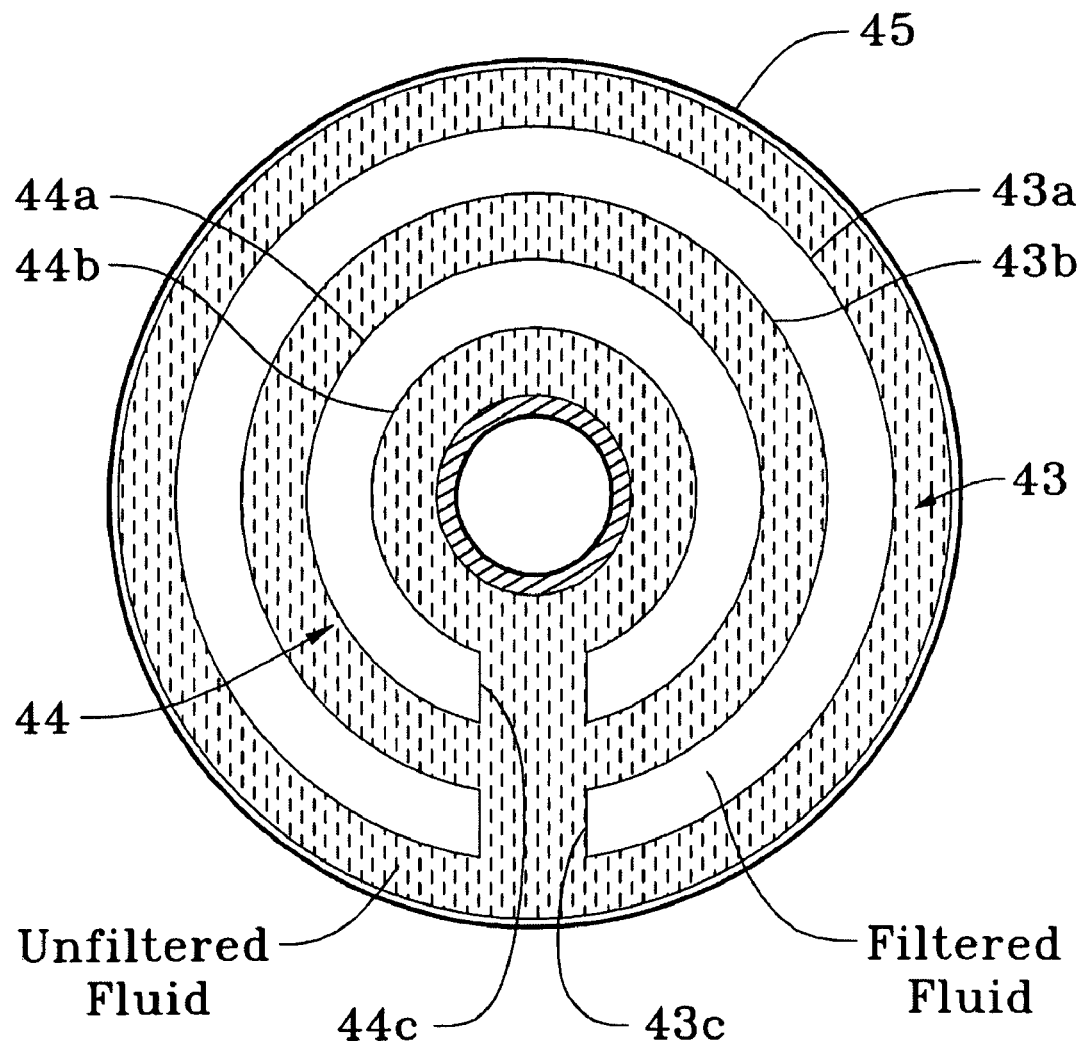

FIG. 4a is a detail of the construction of a wedge wire screen useful in my invention, which can be placed in various positions in the system. As is known in the art, a screen can be made by winding a wedge wire 40, an extruded, triangular section wire, around a cage of parallel ribs 41, fixing them to form a space or slot 42 between them, usually by welding. FIG. 4b is a diagrammatic overhead view of the construction of wedge wire screen I prefer to use. Here, there are two C-shaped screen units 43 and 44 set approximately concentrically in a cylindrical housing 45. Each screen unit 43 and 44 has a convex face 43a and 44a, and a concave face 43b and 44b, both of which are to be contacted by unfiltered fluid, represented here by the shaded areas. Each screen unit 43 and 44 also has end caps 43c and 44c, which may be impervious—that is, it need not be of wedge wire. Together with the concave and convex faces, the end caps form an enclosure. Unfiltered fluid enters the cylindrical housing 45 through inlets not shown (from anywhere through the housing 45, or its top) and passes through both the convex and concave sides of the screen units, leaving solids of the undesired size behind. Filtered fluid within the screen units may then be removed through outlets 52 as illustrated in FIGS. 4d and 4e. It should be noted that both the convex faces 43a and 44a, and the concave faces 43b and 44b of the screen units are constructed so that the flat side of the wedge wire contacts the unfiltered fluid. One of the features of wedge wire screens is that a solid particle will generally not become lodged in a slot 42 because the anterior of the slot is divergent, i.e. between two triangular shapes. Thus the construction of the concave faces 43b and 44b is opposite that shown in FIG. 4a, the wedge wire being laid on the inside of ribs 41 rather than the outside.

Figure 4C:
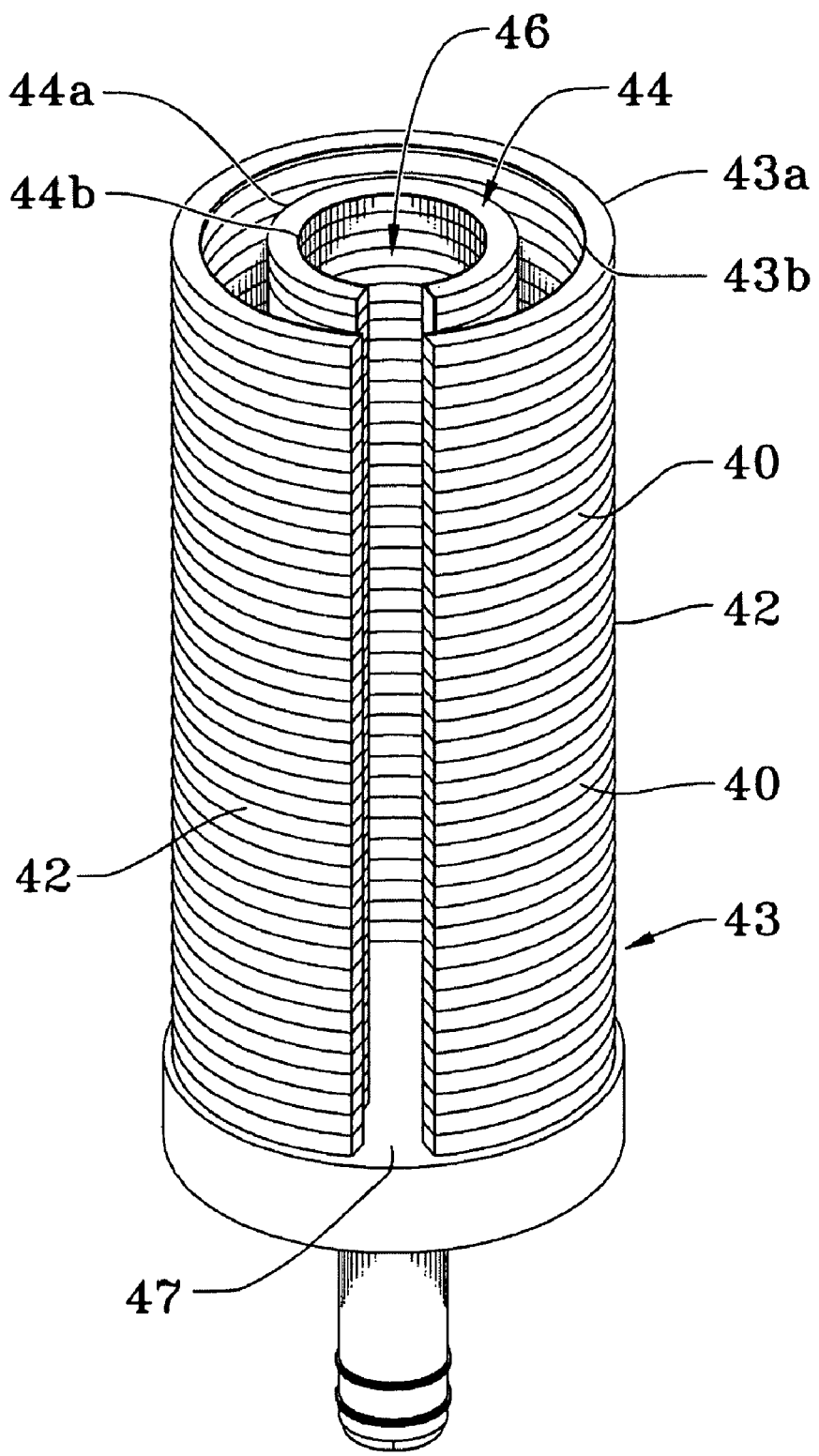
Figure 4D:
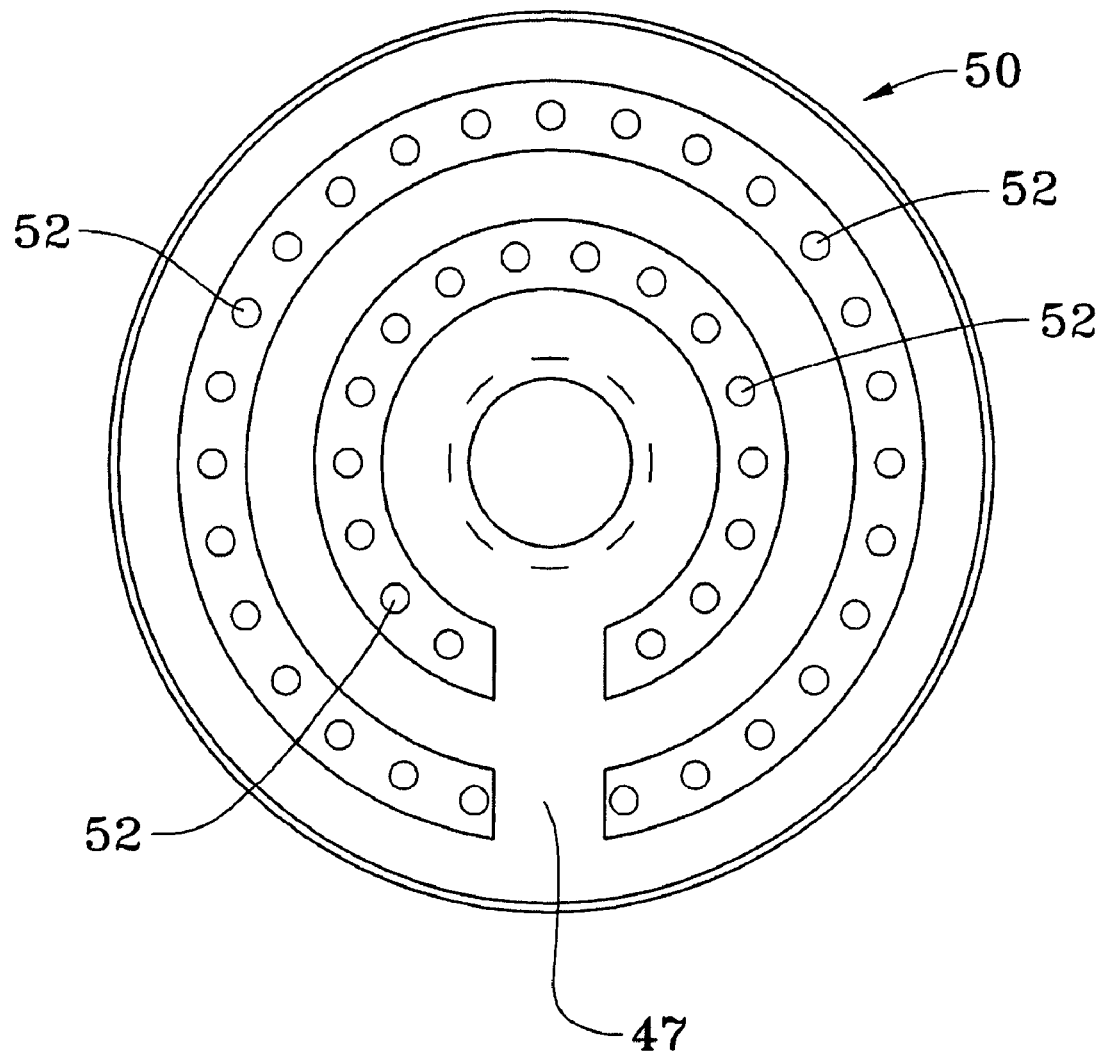
Figure 4E:
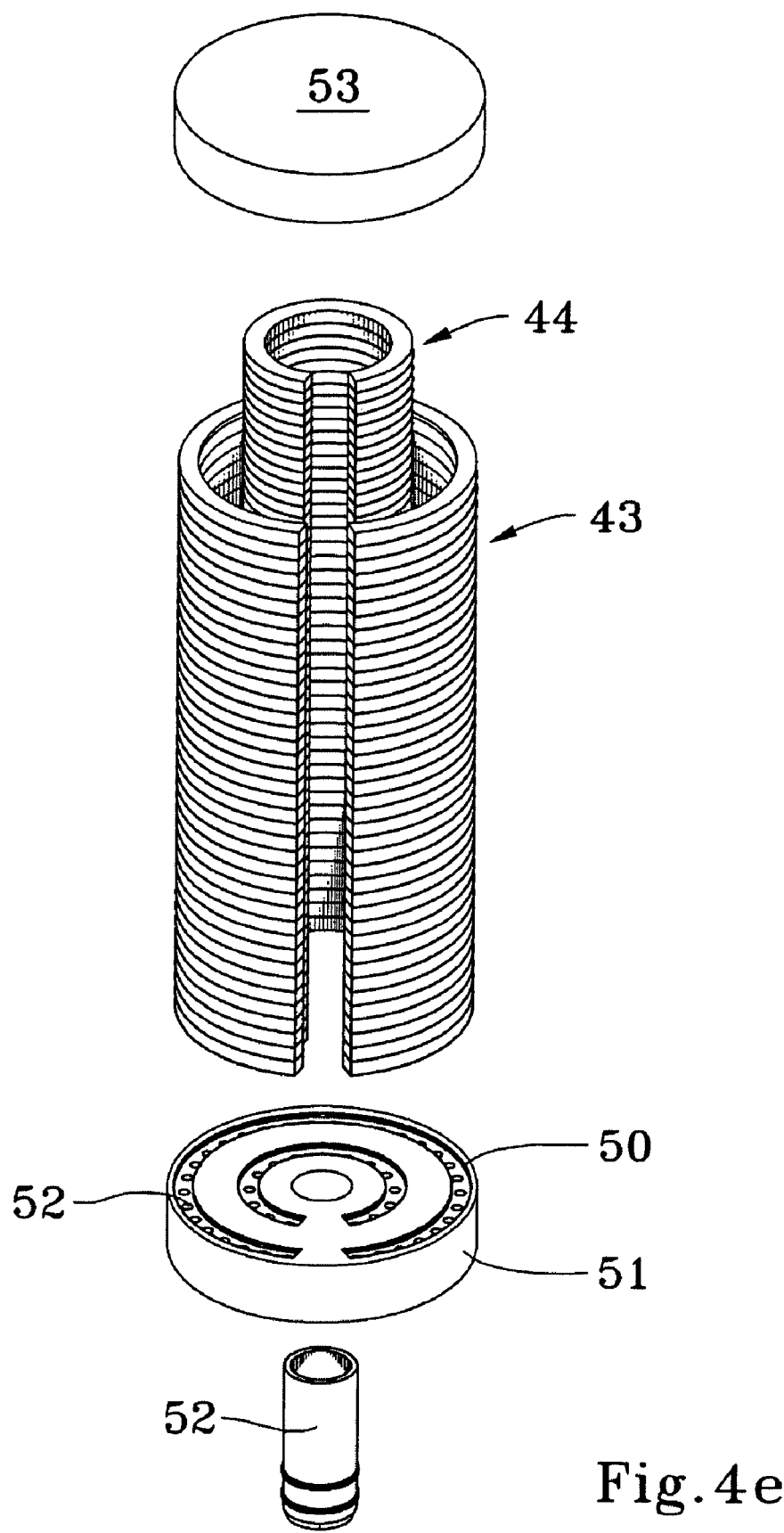

FIG. 4c is a perspective of the two-screen configuration, without the housing 45. Wedge wires form the entire convex (43a and 44a) and concave (43b and 44b) faces of the C-shaped screen units. Slots 42 of the desired dimension are established between wedge wires 40. In the configuration of FIG. 4c, C-shaped screen unit 43 is shown with its opening 46 aligned with opening 47 of C-shaped screen unit 44, but this is not essential—that is, screen unit 43 could be turned, for example 180 degrees so that opening 46 is oriented away from opening 47 of screen unit 44. Referring to FIGS. 4d and 4e, the top plate 50 of reservoir 51 is seen to have outlets 52 for filtered fluid having passed through the wedge wire screens of screen units 43 and 44. Housing 45 and the two screen units 43 and 44 are sealed to top plate 50. Filtered fluid collects in reservoir 51 and is removed through pipe 54. FIG. 4e is an exploded view of the top seal 53, screen units 43 and 44, reservoir 51 with its top plate 50, and pipe 54. Housing 45 and the inlet for the dirty fluid are not shown in this view.

A screen such as depicted in FIGS. 4a-4e, or any other effective screen, may advantageously be placed immediately upstream of a viscometer to protect it from solids, or just ahead of the filter. In addition to removing potentially damaging solids, the wedge wire screen can perform the function of breaking up "fish-eyes" or other localized gel blobs, as well as shearing a viscous fluid, sometimes delaying the point at which the fluid is diverted or at which the pump is shut down. The wedge wire screen may be placed, for example, anywhere in lines 8 or 9.

The viscometer may be operated continuously or intermittently, and the control signal(s) may also be generated either continuously or intermittently.

Our invention also includes the use of a viscometer in combination with a cavitation device (sometimes referred to herein as "SPR," derived from the term "shockpower reactor"), usually together with temperature or additional viscosity monitoring. In this aspect of our invention, dirty fluid from a well is monitored first for viscosity. If the viscosity is above a predetermined value deemed too viscous for the filter, the fluid is diverted to pass through an SPR, where it is heated and/or shear-thinned as will be explained below. In a version of the invention using a cavitation device, described below and with respect to FIG. 5, the fluid emerging from the SPR is monitored for temperature, which is used as feedback to control the revolutions per minute of the SPR, taking into account the flow rate of the fluid, and to maintain the fluid exiting from the SPR at a predetermined temperature. This predetermined, controlled, temperature of the fluid is chosen based on the kind of polymer known to be present in the fluid, its estimated concentration, and on the known relationship of temperature to viscosity of the polymer in the fluid. The fluid thus heated is therefore presumed to have a viscosity low enough to pass through the filter without fouling it. Depending on the type of polymer, it may not have been damaged by heating in the SPR only to the extent necessary to reduce the viscosity to a value which will permit the polymers to pass through the filter. Generally, the mechanism is that the SPR will heat the fluid containing the polymer by cavitation, the heating taking place without contact with heat exchange surfaces. Under the elevated temperature, the fluid will become less viscous. There may, at the same time, be a notable shear-thinning effect. The molecules of many types of polymers are not destroyed by the SPR as may happen in a heating apparatus having a metal heat transfer surface.

Preferably the SPR, or cavitation device, is one manufactured and sold by Hydro Dynamics, Inc., of Rome, Ga., most preferably the device described in U.S. Pat. Nos. 5,385,298, 5,957,122 6,627,784 and particularly U.S. Pat. No. 5,188,090, all of which are incorporated herein by reference in their entireties. In recent years, Hydro Dynamics, Inc. has adopted the trademark "Shockwave Power Reactor" for its cavitation devices, and we use the term SPR herein to include the products of this company. The term "cavitation device" as used herein includes SPR's and cavitation devices of other designs or origins that can be used in our invention.

Definition: We use the term "cavitation device," or "SPR," to mean and include any device which will impart thermal energy to flowing liquid by causing bubbles or pockets of partial vacuum to form within the liquid it processes, the bubbles or pockets of partial vacuum being quickly imploded and filled by the flowing liquid. The bubbles or pockets of partial vacuum have also been described as areas within the liquid which have reached the vapor pressure of the liquid. The turbulence and/or impact, which may be called a shock wave, caused by the implosion imparts thermal energy to the liquid, which, in the case of water, may readily reach boiling temperatures. The bubbles or pockets of partial vacuum are typically created by flowing the liquid through narrow passages which present side depressions, cavities, pockets, apertures, or dead-end holes to the flowing liquid; hence the term "cavitation effect" is frequently applied, and devices known as "cavitation pumps" or "cavitation regenerators" are included in our definition. Steam or vapor generated in the cavitation device can be separated from the remaining, now concentrated, water and/or other liquid which frequently will include significant quantities of solids small enough to pass through the reactor. The term "cavitation device" as used herein includes not only all the devices described in the above itemized patents U.S. Pat. Nos. 5,385,298, 5,957,122, 6,627,784 and 5,188,090 but also any of the devices described by Sajewski in U.S. Pat. Nos. 5,183,513, 5,184,576, and 5,239,948, Wyszomirski in U.S. Pat. No. 3,198,191, Selivanov in U.S. Pat. No. 6,016,798, Thoma in U.S. Pat. Nos. 7,089,886, 6,976,486, 6,959,669, 6,910,448, and 6,823,820, Crosta et al in U.S. Pat. No. 6,595,759, Giebeler et al in U.S. Pat. Nos. 5,931,153 and 6,164,274, Huffman in U.S. Pat. No. 5,419,306, Archibald et al in U.S. Pat. No. 6,596,178 and other similar devices which employ a shearing effect between two close surfaces, at least one of which is moving, such as a rotor, and/or at least one of which has cavities of various designs in its surface as explained above.

In the context of the present invention, where the objective is to control the viscosity of the used fluid, especially for a filtration step, the shearing effect, known commonly as shear-thinning, can be at least as important as heating, depending on the type of polymer present. As indicated above, some polymers are able to withstand heating, or shear-thinning, or both with little effect on their viscosity-imparting properties. Others may be reduced in viscosity primarily or even exclusively by shear-thinning.

Figure 5:
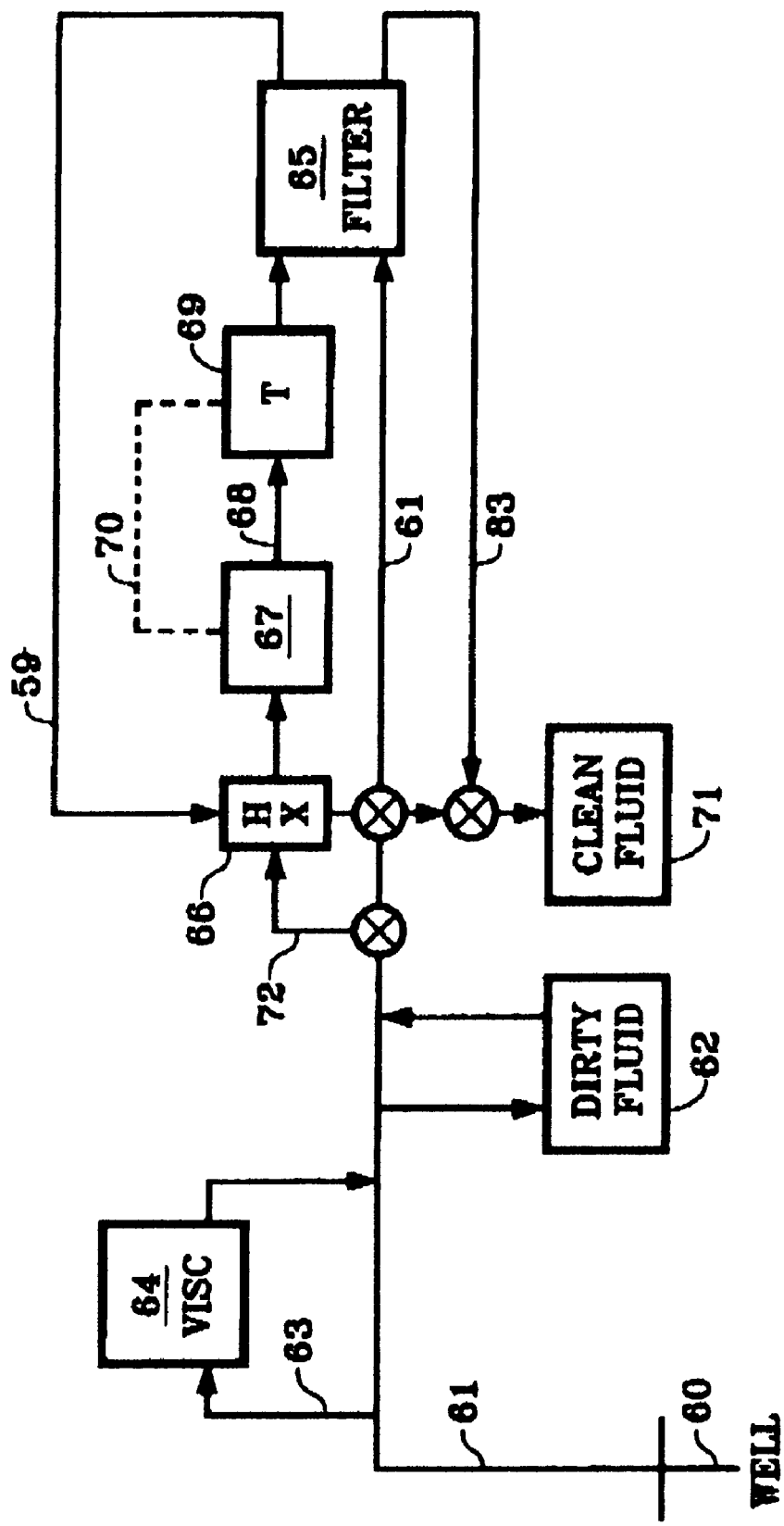
FIG. 5 is a block diagram/flow sheet of a well fluid treating system including a viscometer, a viscosity-reducing device, and a filter. Viscosity of the fluid treated in the viscosity-reducing device is correlated from a temperature reading.

Referring now to FIG. 5, dirty fluid emerges from well 60 into line 61. A slip stream 63 is taken to viscometer 64 where the viscosity is monitored as described above. If and when the viscosity exceeds a predetermined value, the filter would be in danger of clogging if the dirty fluid were allowed to proceed to it. The high viscosity, and the clogging, are effects of water-soluble polymers having been added to the fluid prior to pumping down the well for various purposes known in the art. The operator wishes to filter the dirty fluid in order to reuse it, or components of it such as the polymer, but the operator does not want to risk a shutdown of his operation by clogging the filter; he also does not want to destroy or damage the polymer any more than necessary in order to reduce the viscosity or discard the fluid containing the valuable polymer, if it is possible to preserve it for reuse. Discarding the used fluid can well be an undesirable expense in itself.

In FIG. 5, detecting an unacceptably or undesirably high viscosity results in a diversion of the fluid in line 61 through line 72 to the heater or shear-thinning device 67, which may be a cavitation device (SPR). The viscous fluid arrives at SPR (for example) 67 by passing through, desirably (but not essentially), heat exchanger 66, where it is preheated. The SPR 67 heats and shear-thins the fluid, handling also any solids within it, and passes it through line 68 to the filter 65. The reader should bear in mind that item 67 may be primarily a shear-thinning device although it may be primarily a heater of any suitable type; a cavitation device such as the SPR generally has both effects although it may act primarily as one or the other depending on its construction, the throughput, and other factors. As indicated above, heating and/or shear-thinning the polymer-containing fluid reduces its viscosity. In line 68, or in contact with it, is a temperature monitor 69, which generates a signal representative of the temperature of the fluid emerging from the SPR 67. The temperature signal is used as feedback to control the SPR, automatically or at the operator's discretion, to maintain the desired temperature, and therefore the desired viscosity, in the fluid in line 68. The previously undesirably viscous fluid is thus able to pass through the filter 65 and continue through line 59, optionally (desirably) through heat exchanger 66, where it gives up heat to the incoming fluid in line 72 headed for the SPR 67. The filtered fluid, resuming its relatively viscous state as it cools, augmented by passing through heat exchanger 66, can be placed in clean fluid tank 71 where it may continue to cool, or in a special vessel not shown for clean viscous fluid. The dirty viscous fluid of line 61 has thus been successfully filtered and its valuable components preserved, including the polymer. If the original monitoring step performed by viscometer 64 indicates the dirty fluid in line 61 is not too viscous for the filter, it can be passed directly to filter 65 and be returned through line 83 to the clean fluid tank 71 or a different tank, or be returned directly to use in a well, or otherwise transported for recovery of its components or other uses. It may be observed that lines 83 and 59 could be the same line, to transport any filtered fluid from filter 65; heat exchanger 66 will have no effect where fluid is not passed through line 72 because it is not too viscous.

Figure 6:
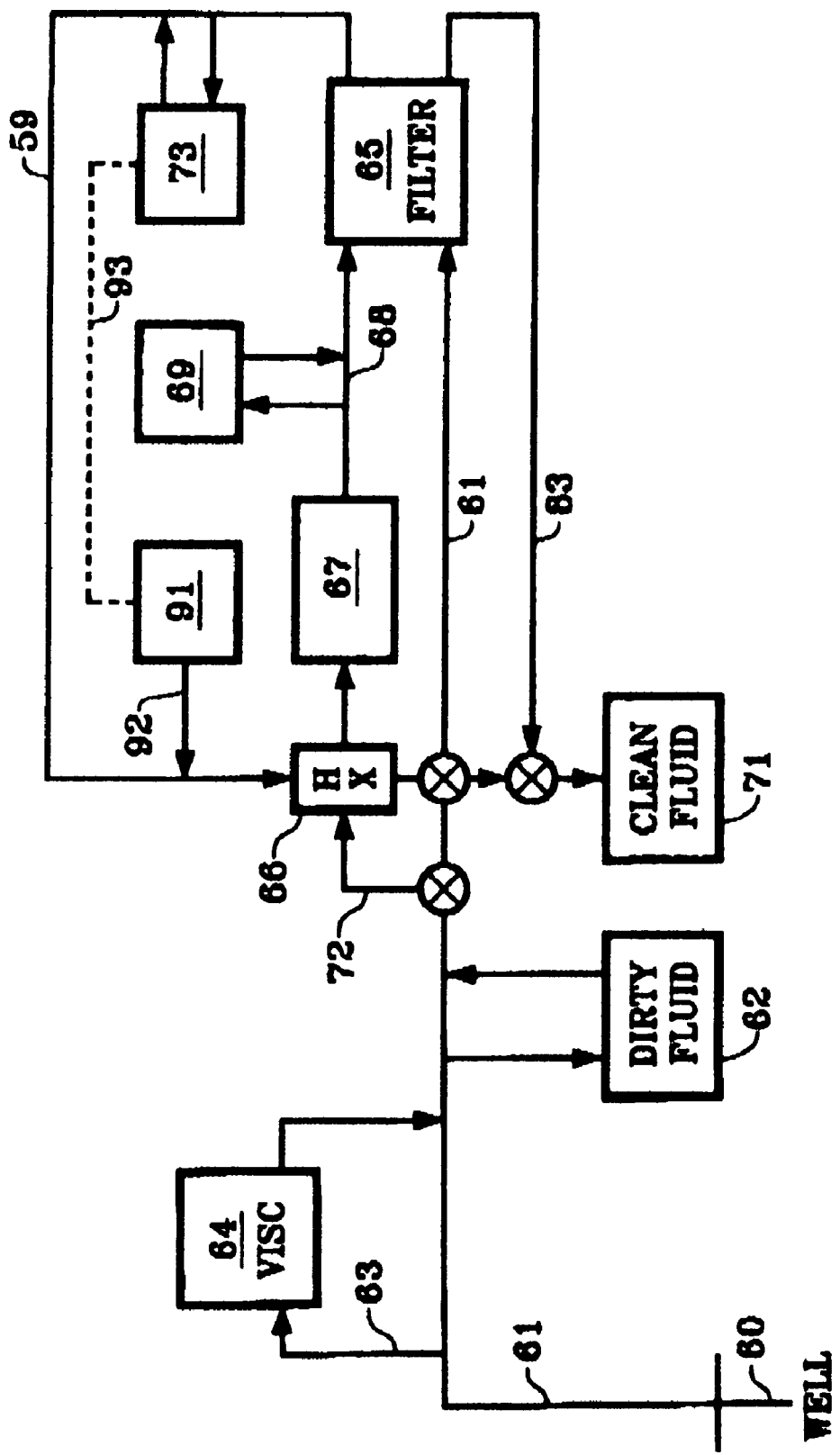
FIG. 6 is a block diagram/flow sheet of a well fluid treating system similar to that of FIG. 5 except that the viscosity of the fluid passed through the paradigm cavitation device is determined by at least one additional viscosity or other reading.
Figure 7:
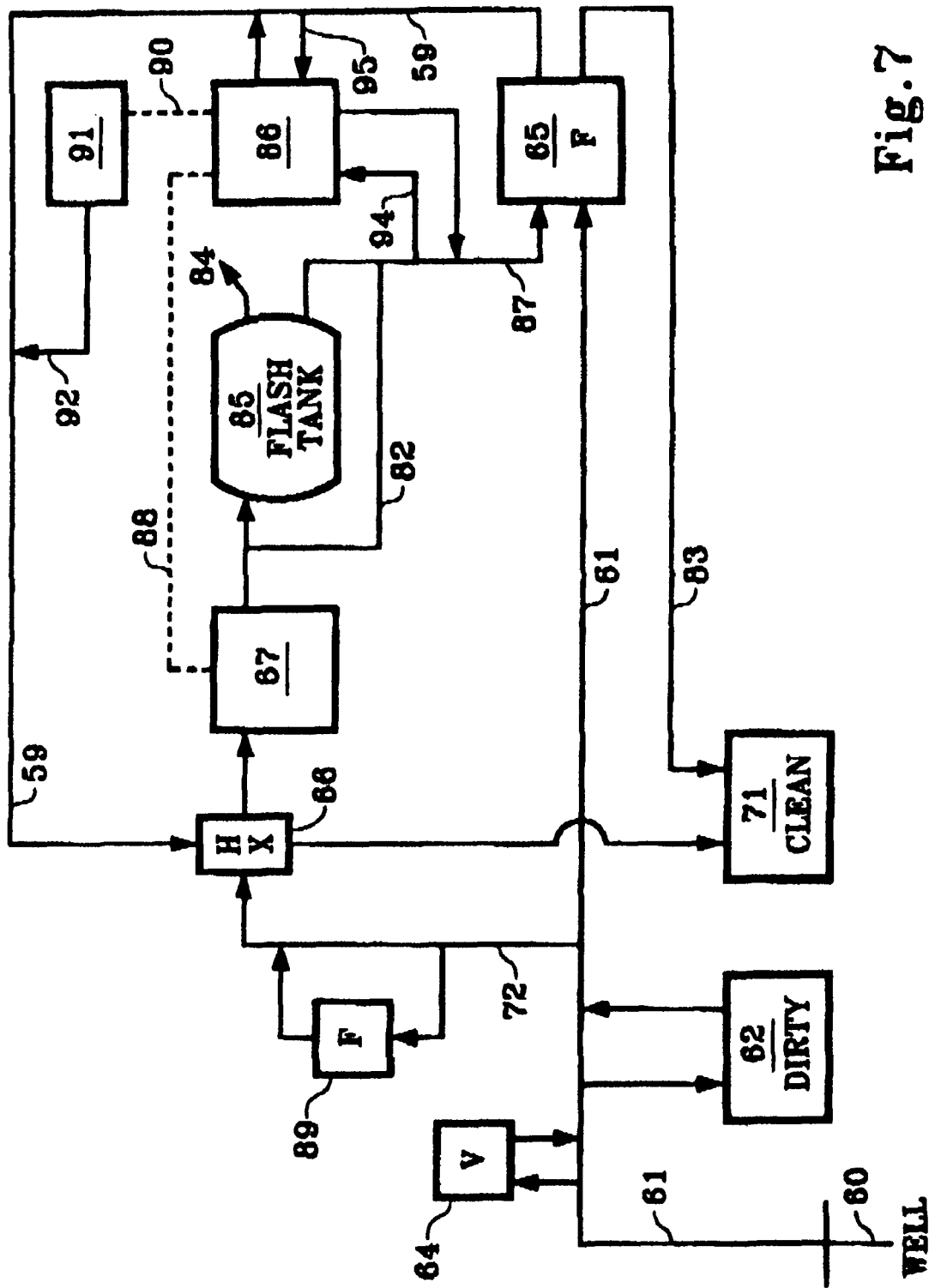
In FIG. 7, the cavitation or other fluid treatment device can be used either to reduce the viscosity of a highly viscous fluid or to heat a dilute fluid in order to increase the concentration of a viscosifying agent in the fluid. Several options for monitoring and adjusting the fluid are presented.

It should be understood that the necessary pumps, valves, and controls are not shown in FIG. 5, 6, or 7. For example, the viscometer 64 will generate a signal representative of viscosity which will activate a control device, not shown, appropriate in turn to activate a valve to divert the fluid from line 61 to line 72 (or the valve could be turned manually). Also temperature monitor 69 will generate a signal (represented by dotted line 70) which can be used to control the revolutions per minute of the SPR 67 and/or the flow rate of fluid into the SPR 67, maintaining the temperature in line 68 at a temperature at which the viscosity will be acceptable for the filter. The operator will be aware of the type of polymer he is using in the system and will choose a temperature appropriate to assure a viscosity of desirably reduced value based on the known properties of the polymer and its concentration in the fluid. Fluid which is deemed too viscous for the filter may of course be diverted into a tank rather than proceeding directly to the SPR, and treated in the SPR later, or it may be mixed with a less viscous fluid either in a pipeline or in a tank. Dirty fluid tank 62 may be used simply for storage of dirty or viscous fluid if the volume of fluid is deemed too great or for any other reason; appropriate controls can enable the necessary diversions of flow.

Also, in any of the methods, systems or configurations contemplated herein, it should be understood that the fluid may be recycled through the viscosity-reducing device, whether it is a heater, a shear-thinning, device, a cavitation device, or other viscosity-reducing device. For example, in FIG. 5 or 6, appropriate controls, valves and pumps may redirect a portion of the fluid in line 68 (or the fluid in line 82 or 87 of FIG. 7) to a point in line 72, upstream of the viscosity-reducing device 67 so that it may again pass through the viscosity-reducing device. In practice, the portion of fluid thus recycled could range from 1% to as much as 99%, depending on many factors, such as desired flow rates, the capacity of the overall system, the desired temperatures and/or viscosities at different points in the system, and the residence time perhaps indicated by a thixotropic fluid having a time-dependent variable viscosity. Some polymers such as certain xanthan derivatives are known to recover their viscosity-enhancing properties within seconds after the cessation of shearing, but the effects of temperature will continue while the temperature is relatively high. Such factors will enter into the operator's decisions on the percent recycle and the time required for the polymer to travel from the viscosity-reducing device to the filter.

Referring again to FIG. 1, a fluid in line 9 determined to be too viscous for filter 5 can be sent to an SPR in a manner similar to that of FIG. 5. That is, it may be sent directly to an SPR for heating and consequent viscosity reduction before it enters filter 9. In this case, the viscous fluids tank 14 may be bypassed. That is, dirty fluid in line 9 can be monitored for viscosity as in FIG. 5 and, if it is too high, the dirty fluid can be sent directly to the SPR, then through a temperature monitor and then to the filter as in FIG. 5. It is also contemplated for the system of any of the figures that a fluid deemed too viscous for other filters may be sent directly to a filter made of sintered plastic particles described in the above identified Smith and Fullerton patents U.S. Pat. Nos. 6,030,558 and 6,399,188, which filters are capable of shear-thinning and filtering at the same time. The Smith and Fullerton filters are described as having open-cell omnidirectional pores; they are made of generally uniform sintered pellets of polyethylene or other thermoplastics, thus providing a narrow pore size distribution. Pore size is determined by the diameter of the pellets, which is a maximum of one-eighth inch and preferably no more than 0.06 inch. Neither heating nor a separate shear-thinning step will be required when such a filter is used. Our invention contemplates the use in this context of any filter capable of shear-thinning a viscous fluid.

In the description of FIGS. 5 and 1 above involving the SPR, it should be understood that the temperature monitor is suggested as a less expensive alternative to a second viscometer. For virtually all polymers likely to be used in oilfield fluids, the temperature of the fluid can be correlated (frequently together with an appropriate input for concentration) to viscosity to control the viscosity of the fluid as altered by the viscosity-reducing device such as an SPR by increasing the temperature of the fluid. Nevertheless, it is of course feasible to use a viscometer to monitor viscosity of the fluid directly after passing through the SPR, and in turn control the device (for example, an SPR) to achieve the desired reduction in viscosity. This may be especially desirable where the shear-thinning effect on the particular composition is significant in addition to the heating effect. On the other hand, as the operation and specifications of the SPR may be well known to the operator, it may be practical in many cases to dispense with the temperature monitor and rely on the SPR's ability to heat fluid to desired temperatures in estimated ranges of flow rates, possibly taking into account other properties of the fluid. That is, in some cases, precision as to temperature or viscosity may not be necessary, since the purpose of heating is simply to assure that the fluid can pass through the filter without clogging it.

As many polymer-containing oil well fluids are thixotropic, the action of a cavitation device will in some cases exhibit a shear-thinning effect as well as a heating effect. As noted in the definition of "cavitation device" above, an important effect of a cavitation device is to induce cavitation, which imparts heat to the fluid, but the flow patterns which bring about cavitation typically include flow in narrow passages and especially between closely parallel surfaces, one of which is moving, resulting in shear-thinning if the fluid is thixotropic, or if it is physically degraded by the shearing and/or turbulent flow in the cavitation device. As is known in the art, a polymer-containing fluid may be, at least to some extent, reversibly thixotropic. Return to its original viscosity may be time-dependent—that is, it may not assume its previous relatively high viscosity immediately on discontinuing shearing; accordingly, whatever shear-thinning effect there is on such a fluid in the cavitation device may be expected to last through the filtration step.

FIG. 6 shows a configuration similar to FIG. 5 but in which an additional monitor 73, which may be a viscometer or a temperature monitor, is placed on line 59 emerging from filter 65. The operator is thus able to vary or control, by transducers, control signals and controls not shown, the operation of viscosity-reducing device 67 (a heater, shear-thinner, or both, such as a cavitation device) to maintain a desired viscosity downstream of the filter 65. Bearing in mind that at least a portion of the thermal energy in the filtered fluid in line 59 may (optionally) be given up in heat exchanger 66, thus likely increasing its viscosity, the operator may or may not deem it necessary or desirable to add viscosity-enhancing agent to the fluid before it enters tank 71 or is reused in a well. An optional feeder 91 for viscosity-enhancing agent is situated upstream of heat exchanger 66 on line 59, but it could also be located downstream of the heat exchanger 66. Viscosity-enhancing additions can be injected into feeder line 92 manually or automatically from feeder 91; dotted line 93 represents a signal responsive to viscosity calculated or measured by monitor 73 or other device capable of generating a signal representative of viscosity in line 59. The signal in line 93 will desirably lead to a computer or automatic controller for operating the feeder according to prearranged programs. In FIG. 6, also, monitor 69, similar to monitor 69 in FIG. 5, is shown connected to line 68 by a slip stream rather than directly in line 68. As in FIG. 5, it may also be used to regulate the viscosity-reducing device 67.

FIG. 7 shows a system which contemplates the possibility of a used well fluid containing polymer having become dilute. Here, viscosity readings from the viscometer 64 may result not only in heating and/or shear-thinning of the fluid in the SPR (for example) 67 if the viscosity is too high, but heating of the fluid in the SPR 67 if the viscosity is too low for immediate reuse because the fluid has become diluted. The control system may act on three different ranges of viscosity—a medium range, which is deemed ready for filtration because the polymer will pass through without clogging, a high viscosity range, where the fluid is treated as in FIG. 5 or 6 to reduce its viscosity before filtering, and a low viscosity range, where polymer is present in the fluid but it has become undesirably dilute for reuse in a well. An undesirable property of the dilute fluid may be its volume—that is, it may be impractical to contemplate addition of polymer to elevate its viscosity to a useful level simply because of the large volume of viscous fluid that might be generated. The medium range fluid may pass in line 61 directly to the filter 65. For the low range possibility, a further option is provided, namely the dilute, dirty, inadequately viscous fluid containing some viscosity-enhancing material is passed through line 72 to a heating and/or shear-thinning device (SPR) 67, preferably absorbing heat in heat exchanger 66 on its way, and then into flash tank 85 where vapor is removed through outlet 84. Outlet 84 may be a simple vent or a conduit, possibly assisted by negative pressures, to one or more devices for capturing the vapor to compress it, condense it, or otherwise conserve its energy or to be used as relatively pure condensed liquid water. The concentrated fluid in flash tank 85 may be passed in line 87 to filter 65 to remove solids, and on through line 59 to heat exchanger 66, where it gives up heat as in FIGS. 5 and 6, and further to the clean tank 71 or to other vessels or conduits for further use as a well fluid or to remove components therefrom. A monitor 86 may be provided to receive a slip stream 94 from line 87 to monitor the viscosity, temperature or other indicator of viscosity; for example if the polymer is such that viscosity is affected by pH, a pH monitor may be used alone or in combination with other monitors. Chemical analyzers may be used at the monitor 86 location to determine the concentration of heavy metal crosslinkers, for example. Chemical analyzers may also monitor the concentration of certain polymers directly, and these results can be used in a manner similar to the measured viscosity, temperature, or pH. Also alternatively or in addition, monitor 86 may receive a slip stream 95 from line 59, to monitor the fluid after filtration. One or more signals from monitor 86 may operate a feeder 91 either directly as indicated by dotted line 90 or indirectly, by which is meant that one or more signals in line 90 will pass to a computer or controller (not shown) which will cause feeder 91 to add pH adjusting chemicals, or viscosity-enhancing crosslinkers for a normally crosslinked guar or other polymeric agent, or other additives, for example to adjust the hydrolysis of a xanthan derivative, for increasing the viscosity of the fluid using the polymer present in the fluid, or additional polymer, such as a guar, to increase the concentration of polymer, added to the fluid in line 59, which is headed for the clean fluid tank 71 or otherwise to be reused in a well. The viscosity or temperature signal from monitor 86 may also (or alternatively) be used as feedback to control the SPR, as indicated by dotted line 88, to maintain a desired viscosity or temperature in line 87. Vapor removal from flash tank 85 through outlet 84 may be controlled also by drawing a variable vacuum on the flash tank 85, which will affect the degree of concentration achieved by the combined efforts of the SPR and the flash tank.

It was mentioned above that fluid may be recycled through the viscosity-reducing devices 67 of FIGS. 5 and 6. This applies also to FIG. 7, where viscosity reduction was discussed as taking place in SPR 67. It is also contemplated that, where the SPR is used to concentrate a dilute fluid in line 72, it may also be recycled from line 82 (not having passed through the flash tank 85) or from line 87 (the concentrate from the flash tank 85) to the input of SPR 67 in line 72. Again, from 1% to 99% of the fluid in lines 82 or 87 could be recycled to the SPR 67 to enhance the performance of the process where it is thought desirable to do so. Line 82 may also be used to bypass all or a portion of the treated fluid around flash tank 85. Recycling to the SPR 67 may also be performed before or after monitor 86 in line 59 or, for whatever reason, in response to a monitor in line 83. Although frequently it will be desirable to concentrate a dilute fluid before filtering it, in order to reduce the volume handled by the filter, filtering before concentrating is also contemplated in our invention.

The discerning reader may recognize that the concentration of polymer in the fluid emerging from the flash tank 85 in line 87 may be in a range such that, after passing through the filter 65 and cooling, will produce a viscosity in the range determined to be useful in an oilfield fluid, although this is not essential in our invention. Thus the SPR will restore the polymer to a desired concentration, at the same time assuring that the dirty fluid can be properly filtered. The filter handles lower volumes of fluid in cases where an original dilute dirty fluid would otherwise require passing a larger volume of fluid through the filter 65. Nevertheless, a filter 89 may be provided as an option where, for whatever reason, it is believed desirable to filter the dilute dirty fluid upstream (on line 72) to the SPR 67. Another option for fluids which are too dilute in polymer and thus not viscous enough for re-use is to add polymer. Low viscosity dilute fluids may occur either as a result of water mixing into the fluid in the formation or in the well, or, as a result of chemical of physical breakdown or degradation of the polymer. Some polymers are pH-sensitive, some are affected by the degree of hydrolysis, some have crosslinkages that are affected by the chemistry of the rest of the solution, and others are subject to breakdown or rupturing of their long molecules as a result of physical stress, sometimes complicated by high temperatures. A chemical feeder such as feeder 91 on line 59 may be installed to respond to readings from viscometer 64 or an additional feeder (not shown) similar to feeder 91 placed on line 61 or on line 83, to make desired adjustments in viscosity by pH, the addition of crosslinkers, polymers, or other chemicals, to enhance the viscosity of the fluid in line 83 if it is desirable to do so.

Some viscosity changes are permanent and others are restorable. Our invention provides that if the polymer loses its viscosity-imparting abilities, or a part of them, in a manner which cannot be restored without adding more, additional polymer can be introduced after filtering, not only in line 59 or 83, but in clean fluid tank 71 or a more topical point of use. If the reduced ability to restore viscosity is temporary, such as due to a change in pH or some other chemical effect, we can provide for appropriate additions to the fluid. Ideally, the operator will be aware of the reversibility and time-dependent thixotropic properties of the fluid, and take them into account in the calculations of the additives needed or desired for the next use in a well, and these future considerations can be programmed into the controllers and/or chemical feeders discussed above.

An original fluid determined to have a viscosity too high for filter 65 will normally bypass flash tank 85—that is, the fluid heated and/or shear-thinned in the SPR will have a reduced viscosity and accordingly will be sent directly to filter 65 from the SPR 67 by way of line 82, similar to FIGS. 5 and 6; monitor 86 may optionally be used to control SPR 67. A slip stream from line 59 may permit monitor 86, or a separate one, to monitor the viscosity of fluid in line 59 in a manner similar to that of FIG. 6, to help provide any additions deemed useful or necessary.

Figure 8:
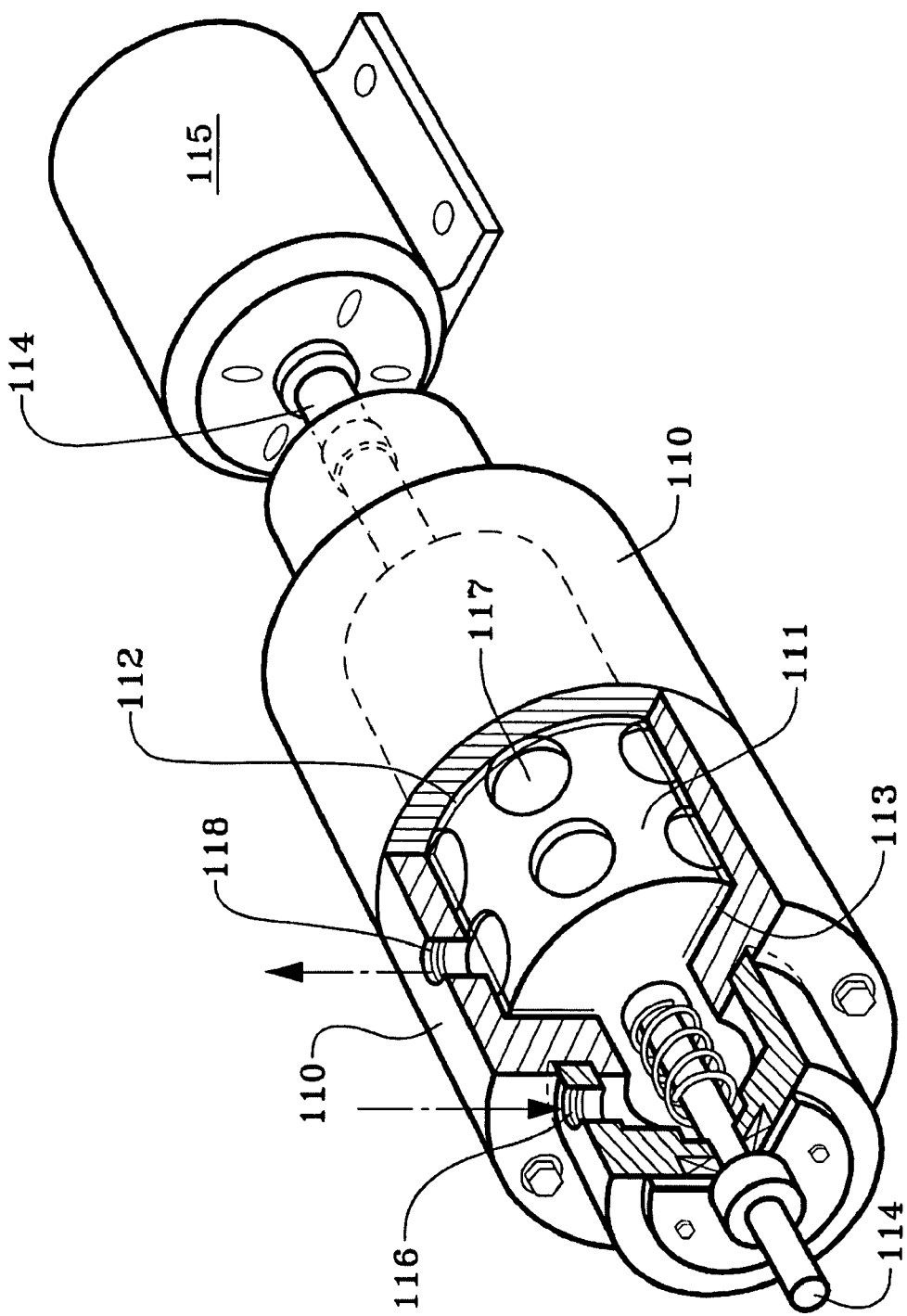
FIG. 8 illustrates a cavitation device useful in our invention for reducing viscosity or removing water from a dilute fluid.

FIG. 8, illustrating an example of a cavitation device, is taken from FIG. 1 of Griggs U.S. Pat. No. 5,188,090, which is incorporated herein by reference in its entirety as indicated above. As explained in the U.S. Pat. No. 5,188,090 patent and elsewhere in the above referenced patents, liquid is heated in the device without the use of a heat transfer surface, thus avoiding the usual scaling problems common to boilers and distillation apparatus.

A housing 110 in FIG. 8 encloses cylindrical rotor 111 leaving only a small clearance 112 around its curved surface and clearance 113 at the ends. The rotor 111 is mounted on a shaft 114 turned by motor 115. Cavities 117 are drilled or otherwise cut into the surface of rotor 111. As explained in the Griggs patents, other irregularities, such as shallow lips around the cavities 117, may be placed on the surface of the rotor 111. Some of the cavities 117 may be drilled at an angle other than perpendicular to the surface of rotor 111—for example, at a 15 degree angle. Liquid—in the case of the present invention, a used oilfield fluid containing a viscosifier—is introduced through port 116 under pressure and enters clearances 113 and 112. As the solution passes from port 116 to clearance 113 to clearance 112 and out exit 118, areas of vacuum are generated and heat is generated within the liquid from its own turbulence, expansion and compression (shock waves). As explained at column 2 lines 61 et seq in the U.S. Pat. No. 5,188,090 patent, "(T)he depth, diameter and orientation of (the cavities) may be adjusted in dimension to optimize efficiency and effectiveness of (the cavitation device) for heating various fluids, and to optimize operation, efficiency, and effectiveness . . . with respect to particular fluid temperatures, pressures and flow rates, as they relate to rotational speed of (the rotor 111)." Smaller or larger clearances may be provided. Also the interior surface of the housing 110 may be smooth with no irregularities or may be serrated, feature holes or bores or other irregularities as desired to increase efficiency and effectiveness for particular fluids, flow rates and rotational speeds of the rotor 111. Rotational velocity may be on the order of 5000 rpm. The diameter of the exhaust ports 118 may be varied also depending on the fluid treated. The machine is very versatile in that considerable variation in pressures and temperatures may be used. Pressure at entrance port 116 may be 75 psi, for example, and the temperature at exit port 118 may be 300° F.

Operation of the SPR (cavitation device) is as follows. A shearing stress is created in the solution as it passes into the narrow clearance 112 between the rotor 111 and the housing 110. This shearing stress (shear thinning) causes an increase in temperature and/or a reduction in viscosity. The solution quickly encounters the cavities 117 in the rotor 111, and tends to fill the cavities, but the centrifugal force of the rotation tends to throw the liquid back out of the cavity, which creates a vacuum. The vacuum in the cavities 117 draws liquid back into them, and accordingly "shock waves" are formed as the cavities are constantly filled, emptied and filled again. Small bubbles, some of them microscopic, are formed and imploded. All of this stress on the liquid generates heat which increases the temperature of the liquid dramatically, contributing to the decrease in viscosity of a viscous solution, or facilitating removal of vapor or steam in the case of a dilute fluid. The design of the cavitation device ensures that, since the bubble collapse and much of the other stress takes place in the cavities, little or no erosion of the working surfaces of the rotor 111 takes place. Any solids present in the solution, having dimensions small enough to pass through the clearances 112 and 113 may pass through the SPR unchanged except in concentration where water is removed.

Thus it will be seen that our invention includes a method of treating a used well fluid containing a viscosity-enhancing agent, comprising passing the fluid through a filter capable of shear-thinning the fluid to reduce its viscosity while also removing solids from the fluid. The filter will desirably be made of sintered polyolefin particles having diameters no greater than one-eighth inch.

While our invention will operate with respect to any viscosity-enhancing agent in a used well fluid, guar and its derivatives, xanthan and its derivatives, and various cellulose derivatives known for their viscosity-imparting properties are especially contemplated.

In addition, our invention includes a method of treating a used well fluid deemed too viscous to pass through a filter without a risk of plugging the filter because of its viscosity, comprising heating or shear-thinning the used well fluid, thereby reducing its viscosity, and passing the fluid having a reduced viscosity through the filter. The heating or shear-thinning may be accomplished at least partly by passing the fluid between two surfaces, at least one of which is moving relative to the other, thereby reducing its viscosity, and then passing the fluid having a reduced viscosity through a filter. Our invention also includes a method of processing a dirty well fluid comprising measuring the viscosity of the well fluid, passing the well fluid through a cavitation device if the fluid is deemed too viscous to be filtered, thereby reducing the viscosity of the fluid, and filtering the fluid thereby obtained. The effect of the cavitation device may be either primarily to heat the fluid, or primarily to shear-thin the fluid, or it may have more or less variable effects of both heating and shear-thinning. Operation of the heater, shear-thinning device, cavitation device, or other viscosity-reducing device may be controlled intermittently or substantially continuously as a function of viscosity, temperature, or pH, of the treated fluid, or the concentration of any constituent therein from which viscosity of the treated fluid may be inferred.

Our invention also includes a method of filtering and conserving an oil well fluid containing a viscosifying agent comprising (a) monitoring the viscosity of the fluid, (b) if the viscosity of the fluid is deemed too high to pass through a filter, reducing the viscosity thereof to a value acceptable for filtering, filtering the fluid and recovering the filtered fluid for reuse of at least a portion of the fluid as a well fluid or a well fluid component, (c) if the viscosity of the fluid is deemed too low to be reused, removing water therefrom, thereby obtaining a concentrated fluid, filtering the concentrated fluid, and recovering the filtered concentrated fluid for reuse of at least a portion of the fluid as a well fluid or a well fluid component, and (d) if the viscosity of the fluid is neither deemed too high to pass through a filter nor too low for the fluid to be reused, filtering the fluid and recovering the filtered fluid thus obtained for reuse of at least a portion of the filtered fluid as a well fluid or a well fluid component.

The invention claimed is:

1. Method of filtering and conserving a used oil well fluid containing a viscosifying agent comprising (a) monitoring the viscosity of said fluid, (b) if the viscosity of said fluid is deemed too high to pass through a filter, reducing the viscosity thereof to a value acceptable for filtering, filtering said fluid and recovering said filtered fluid for reuse of at least a portion of said fluid as a well fluid or a well fluid component, (c) if the viscosity of said fluid is deemed too low to be reused, removing water therefrom, thereby obtaining a concentrated fluid, filtering said fluid before or after removing water from it, and recovering said filtered concentrated fluid for reuse of at least a portion of said fluid as a well fluid or a well fluid component, and (d) if the viscosity of said fluid is neither deemed too high to pass through a filter nor too low for said fluid to be reused, filtering said fluid and recovering the filtered fluid thus obtained for reuse of at least a portion of said filtered fluid as a well fluid or a well fluid component.

2. Method of claim 1 wherein the fluid recovered in steps (b), (c), and (d) are placed in a common receptacle.

3. Method of claim 1 including, in step (b), passing said fluid through a cavitation device to reduce its viscosity.

4. Method of claim 3 including recycling at least some of said fluid through said cavitation device before filtering said fluid.

5. Method of claim 3 including passing said filtered fluid through a heat exchanger to provide thermal energy to the fluid entering said cavitation device.

6. Method of claim 3 wherein operation of said cavitation device is substantially continuously controlled to maintain a desired viscosity in the fluid coming from said cavitation device.

7. Method of claim 3 including monitoring the temperature of said fluid coming from said cavitation device, and correlating said temperature to said desired viscosity.

8. Method of claim 3 including, in step (c), passing said concentrated fluid into a flash tank prior to filtering, to enhance the removal of water from said fluid.

9. Method of claim 3 including, in step (c), passing said concentrated fluid through a heat exchanger to provide thermal energy to the fluid entering said cavitation device.

10. Method of claim 1 including, in step (c), removing water from said fluid by passing it through a cavitation device.

11. Method of claim 10 including recycling at least some of said concentrated fluid to said cavitation device before filtering said fluid.

12. Method of claim 1 including adding one or more viscosity-enhancing agents to said filtered fluid.

13. Method of claim 1 including, in step (c), monitoring said concentrated fluid for viscosity or viscosity-inducing agents, and feeding one or more additives to said concentrated fluid maintain a desired viscosity in said concentrated fluid in response thereto.

14. Method of claim 1 wherein, in step (c), the water removed from said fluid is removed in the form of vapor.

15. Method of claim 14 including the step of recovering said vapor for reuse as clean liquid water.

16. Method of claim 1 including adjusting the concentration of one or more components of said filtered fluid obtained in step (d).

* * * * *